Sept. 19, 1950  H. C. WENDT  2,523,081
GYROSCOPE ELECTRICAL CONNECTION APPARATUS
Filed Aug. 15, 1947

Inventor:
Harry C. Wendt,
by Claude A. Mott
His Attorney.

Patented Sept. 19, 1950

2,523,081

UNITED STATES PATENT OFFICE 2,523,081

GYROSCOPE ELECTRICAL CONNECTION APPARATUS

Harry C. Wendt, Lynnfield, Mass., assignor to General Electric Company, a corporation of New York Application August 15, 1947, Serial No. 768,877

3 Claims. (Cl. 173—324)

The present invention relates generally to gyroscopes and more particularly to an improved arrangement for establishing low-friction electrical connections between relatively rotatable parts of a gyroscope.

Many gyroscopes require mounting arrangement giving 360 degrees of rotational freedom about one or more of the gyroscope axes. In cases where the gyroscope is electrically driven there must be provided freely rotatable connecting apparatus for establishing a number of electrical connections between the relatively rotatable parts of the gyroscope. When the gyroscope is used as a control element in an electric automatic pilot for moving vehicles, connections must also be provided for the gyroscopically actuated electric signal generators. For such applications there may be a need for providing six or more separate electric circuit paths between relatively rotatable parts.

The gyroscope mounting arrangement, which permits the universal movement of the gyroscope relative to its support, must be as nearly frictionless as possible as any friction causes precession errors impairing the accuracy of the gyroscope as a position reference. The use of precision bearings keeps the bearing friction within acceptable limits but the advantage of precision bearings, which are expensive, is lost if the electrical connection apparatus imposes appreciable additional friction in the system.

Heretofore it has been customary to use a slip ring and brush arrangement to provide freely rotatable electrical connections in electric gyroscopes. Slip ring arrangements, however, especially when multiplied to give a large number of electrical circuit connections, give undesirably high friction. Slip ring friction can, to a limited extent be lowered by reducing the diameter of the slip ring but the lower limit is quickly reached because of the need for providing adequate electrical insulation between the ring and its support.

An object of the present invention is to provide an improved arrangement for establishing electrical circuit connections between relatively rotatable parts of a gyroscope.

A further object of the invention is to provide electrical connection apparatus for establishing a plurality of electrical circuits between relatively rotatable parts of a gyroscope without imposing appreciable friction therebetween.

Further objects and advantages of my invention will become apparent as the following description proceeds and the features of novelty which characterize my invention will be pointed out with particularity in the claims annexed to and forming a part of the specifications.

Figure 1:
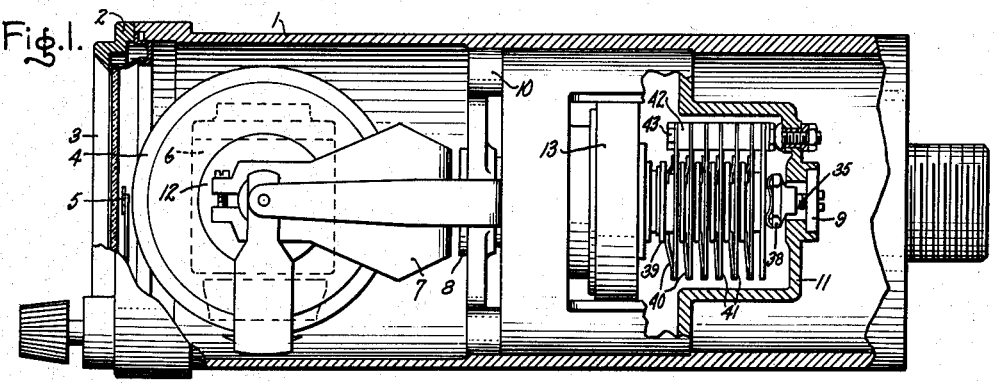
Fig. 1 is a side elevational view, partly in section, of gyroscopic navigation instrument having an electrical connection arrangement constructed in accordance with the present invention.

I have chosen to illustrate my invention in connection with a gyroscopic navigation instrument known as a universal attitude gyro, but it should be clearly understood that such use is exemplary only and that the invention may be used in connection with many kinds of gyroscopes and gyroscopic instruments where the problem of rotating circuit connections exists.

Referring to the drawing the instrument is shown as comprising a cylindrical casing 1 having at its forward end a face plate 2 by means of which the instrument may be mounted on an instrument panel of an aircraft. The face plate has an opening 3 through which a pilot or other observer may note pitch and bank movements of an indicator 4 relative to a reference index 5. The indicator is stabilized by means of a gyro vertical, the bearing frame of which is indicated at 6. The bearing frame 6 is mounted on a yoke shape gimbal member 7 for rotation about a transversely extending minor gimbal axis. The gimbal member 7 is mounted for 360 degrees of freedom about a longitudinally extending major gimbal axis by means of forward and rear bearings 8 and 9. The bearings 8 and 9 are supported on frame members 10 and 11 which are, in turn, supported by the casing 1.

The gyroscope is driven by an electric motor located within the bearing frame 6 (not shown) and in cases where a three phase motor is used it is necessary to provide three electric circuit connections to the motor. In addition to indicating pitch and bank attitudes of an aircraft the instrument may also be used to provide electrical pitch and bank signals for operating an automatic pilot. For that purpose there may be provided a pitch pick-off 12 actuated by movement of the gyro bearing frame about the minor gimbal axis and a roll pick-off 13 actuated by movement of the gimbal member 7 about the major gimbal axis. The details of the pick-offs 12 and 13 are not shown since they are conventional but in connection with the use of such pick offs, which may for example be A.-C. Selsyns, it is necessary to provide additional electric circuit connections.

In the instrument shown stops may be provided to limit the rotation of the gyro bearing frame relative to the gimbal 7 to something slightly less than 180 degrees and because of this limited movement it is possible to use electric conducting spirals to establish electric circuit connections between the gimbal 7 and the gyro bearing frame 6. However, to provide bank (roll) indications for all positions of the aircraft about the roll axis it is necessary to provide electrical connection apparatus for conducting electrical current from the frame to the gimbal 7 which permits 360 degrees of rotation of the gimbal 7 about the major longitudinal gimbal axis.

Where a large number of electrical circuit connections are required such as six, in the case of the illustrated instrument, I have found that conventional slip ring and brush arrangements cause so much friction that the indicating accuracy of the gyroscope is impaired. According to my invention I have devised an arrangement in which the sliding friction of the conventional brush and ring arrangement is replaced by rolling friction whereby the friction imposed on the gyroscope system by the electrical connection apparatus is greatly reduced.

Figure 2:
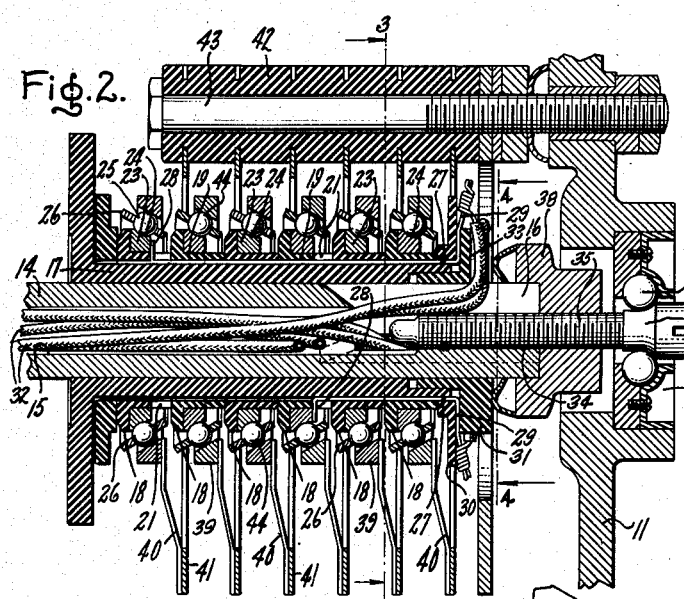
Fig. 2 is an enlarged cross sectional view showing the constructional details of the electrical connection apparatus.
Figure 4:
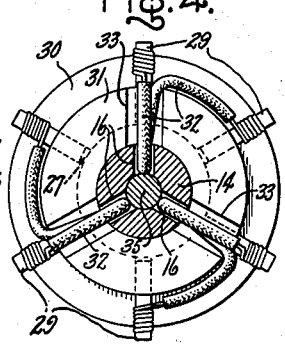
Fig. 4 is a view taken along the section line 4—4 of Fig. 2 looking in the direction of the arrows.

Referring now to the constructional details of my improved electrical connection apparatus, it will be noted, by reference to Fig. 2, that there is a trunnion member 14 which constitutes an extension of the gimbal member 7, the trunnion being supported by the forward and rear bearings 8 and 9. The trunnion 14 has an axial bore 15 and adjacent the right-hand end thereof there are provided three radial slots 16, the purpose of which will become apparent as the description proceeds.

Figure 5:
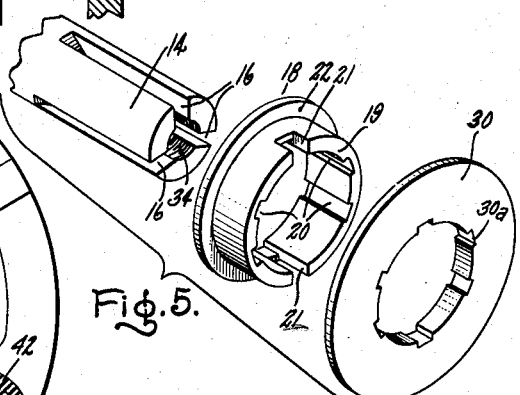
Fig. 5 is an exploded perspective view illustrating certain structural details.

Mounted upon the trunnion 14 is a tubular insulating member 17 which acts as an insulating support for electrical connecting elements mounted thereon. Stacked upon the insulating member 17 are a plurality of ring-shaped insulators 18, the shape of which is best shown in Fig. 5 of the drawing. The insulating members 18 have a tubular body portion 19 the inside surface of which is provided with a series of axial slots 20. The body portion 19 also has a pair of radial slots 21, and an upstanding flange 22 located at one side thereof.

Mounted on and backed against the flange 22 of each of the insulators 18 is an annular conductor member 23 having a grooved surface 24 adapted to receive in rolling relation a plurality of rotating ball contacts 25. The ball contacts are formed of electrical conducting material such as, for example, beryllium copper and are maintained in a circularly spaced pattern, in the illustrated arrangement, by means of conical spacers 26 which permit free rotation of the balls. These spacers may be similar to those used in ball bearings. The spacers may be eliminated in cases where enough balls are used to maintain their position by contact of adjacent balls.

In order to provide electrical connections to each of the annular conductor members 23, there are provided axially extending conductor strips 27 which lie between the insulating member 17 and the stacked insulators 18, the clearance for these strips being provided by the axial slots 20 in the insulators. The left-hand ends of these conducting strips are bent upwardly so that they extend through slots 21 and form connecting tabs 28 which are fastened to the conductor members 23 in any suitable manner, as by soldering. The right-hand ends of the conductor strips 27 are bent to provide radially projecting tabs 29 which are securely clamped in position between a stacked end washer 30 and a collar 31 mounted on the trunnion 14. The washer 30 has conductor receiving slots 30a similar to the slots 20 in insulators 18.

Insulated electrical connecting wires 32 running from the rotatable gimbal 7 are threaded through the axial bore 15 in the trunnion 14, the ends of the wires extending radially outwardly through the trunnion slots 16. Radial grooves 33 in the collar 31, provide convenient recesses for receiving the wires 32, the ends of which are bared and connected to the tabs 29 in any suitable manner, as by soldering.

The right-hand end of trunnion 14 is threaded at 34 to receive a threaded stud 35, the outer end of which is enlarged to provide a race 36 for balls 37 forming a part of the rear trunnion bearing 9. The conductor and insulator ring assembly is clamped in position on the trunnion 14 by means of a suitable check nut 38 which is threaded on the stud 35 and bears against the retaining collar 31.

The electrical connecting elements thus far described rotate with the gimbal member 14 and provide the rotating parts of the electrical connection apparatus. The cooperating stationary parts will now be described.

Associated with each annular conductor member 23 in coaxial relation therewith is a stationary annular contact member 39. Each contact member 39 is connected to and supported by three radially extending resilient strips 40, the inner ends of which are secured to the contact member 39 in any suitable manner, as by soldering.

The outer ends of the strips 40 are secured, as by soldering, to current conducting washers 41. The washers 41 are held in proper spaced relation by three insulating members 42 provided with axial bores to receive mounting bolts 43 which are threaded into the frame member 11.

Figure 3:
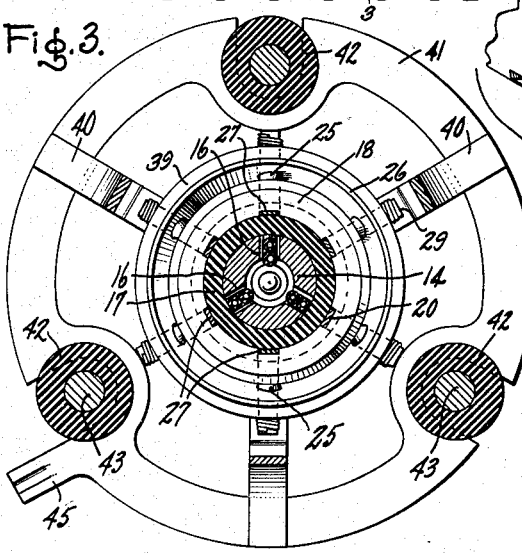
Fig. 3 is a view taken along the section line 3—3 of Fig. 2 looking in the direction of the arrows.

The spring arms 40 are initially warped or bent so as to force tapered bearing surfaces 44 of the contact members 39 to the left against the ball contacts and thereby maintain contact pressure between the contact members 39, the rotating ball contacts 25, and the conductor members 23. Tabs 45 (Fig. 3) on the conducting washers 41 provide convenient means for connecting stationary wires carried in the casing (not shown) to the stationary contacts.

It will now be clear that the electrical connection apparatus, above described, provides a plurality of electrical current-conducting paths which may be traced as follows: Wires 15, tabs 29, conducting strips 27, tabs 28, conductor members 23, ball contacts 25, contact members 39, conducting strips 40, washers 41, and taps 45 which are connected to stationary wires (not shown). With this arrangement the sliding friction previously encountered with slip rings is replaced by much lower rolling friction between the contact balls 24 and the annular conductor and contact members 23 and 39. The reduction in friction obtained by the use of the rolling contacts permits a large number of circuit connections to be made without excessive friction, such as would cause erroneous precession of the gyroscope. Furthermore the above described construction permits adequate electrical insulation between the various circuit connections and between the circuit connections and the supporting trunnion. Actual tests have shown that with the above described arrangement the friction between relatively rotatable parts is less than one-fifth of that encountered with a comparable slip ring and brush arrangement.

I have illustrated my improved electrical connection apparatus as installed between the rotatable gimbal and frame of a gyroscope, but it will be apparent to those skilled in the art that a similar arrangement can be provided between the gyro bearing frame and gimbal if it is desired. Furthermore it will be apparent that other forms of rotating contacts, such as cylinders, may be substituted for the balls 25.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. Substantially frictionless apparatus for establishing a plurality of electrical circuits between relatively rotatable parts of a gyroscope comprising a rotatable trunnion, a plurality of sets of current conducting devices, each set comprising an annular conductor member, an annular contact member of conductive material and a set of rotatable, current-conducting contacts disposed between each of said contact and conductor members, said contacts being shaped to establish rolling electrical connections between the contact and conductor members of each set, fastening means for attaching the conductor members to said trunnion in stacked relation along the axis of said trunnion, insulating means arranged to electrically insulate the annular conductor members from each other and from said trunnion, relatively fixed supporting means resiliently supporting each annular contact member in substantially coaxial relation with its associated conductor member, and a spring biasing each contact member to maintain contact pressure between the contact member, conductor member and rotatable contacts of each of said sets of conducting devices, and connecting means for making separate circuit connections to each of said conductor and contact members.

2. Apparatus associated with a freely rotatable gyroscope trunnion for establishing low friction electrical connections between electrical apparatus supported by said trunnion and connecting means attached to a relatively fixed trunnion support, comprising an insulating member mounted on said trunnion, a conductor member forming a circular conducting path mounted on said insulating member, a contact member forming a circular conducting path having a diameter greater than said conductor member path, a fixed supporting member carried by said fixed support and mounting said contact member coaxially with said conductor member, and a set of rotatable, current-conducting contacts disposed between said conductor and contact members, said supporting member being arranged to resiliently bias said contact member to maintain contact pressure between said contact member, said rotatable contacts and said conductor member whereby said contacts establish low friction rolling electrical connections between said contact and conductor members upon rotation of said trunnion relative to said support.

3. Electrical current conducting apparatus adapted for use with a universally mounted gyroscope comprising a trunnion member with an axial bore, a plurality of annular insulating members, means for clamping said insulating members on said trunnion member in stacked relation, an annular conductor member mounted on each insulating member, an annular contact member associated with each conductor member and having a diameter greater than that of said conductor member, a set of current-conducting balls disposed between each conductor and contact member, relatively fixed resilient supporting means for supporting each contact member, said supporting means being arranged to bias each contact member in a direction to maintain contact pressure between the contact member, conductor member and the intermediate balls, means for connecting wires threaded through the bore of said trunnion member to each of said conductor members and means for connecting relatively fixed wires to each of the corresponding contact members.

HARRY C. WENDT.

REFERENCES CITED

The following references are of record in the file of this patent:

UNITED STATES PATENTS

| Number | Name | Date |
|---|---|---|
| 1,316,561 | Dewald | Sept. 23, 1919 |
| 1,761,832 | Johansson | June 3, 1930 |
| 2,145,363 | Miller | Jan. 31, 1939 |
| 2,376,370 | Lombardi | May 22, 1945 |
| 2,390,532 | Haskins | Dec. 11, 1945 |
| 2,436,949 | Anderson | Mar. 2, 1948 |
| 2,451,959 | Knudsen | Oct. 19, 1948 |

FOREIGN PATENTS

| Number | Country | Date |
|---|---|---|
| 427,433 | Great Britain | Apr. 24, 1935 |